(12) United States Patent
Partamian

(10) Patent No.: US 7,853,934 B2
(45) Date of Patent: Dec. 14, 2010

(54) HOT-SWAPPING A DYNAMIC CODE GENERATOR

(75) Inventor: Noubar Partamian, Cupertino, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1288 days.

(21) Appl. No.: 11/165,004

(22) Filed: Jun. 23, 2005

(65) Prior Publication Data

US 2006/0294498 A1  Dec. 28, 2006

(51) Int. Cl.
*G06F 9/45* (2006.01)
(52) U.S. Cl. ............... 717/140; 717/106; 717/139; 717/148
(58) Field of Classification Search ............ 717/118, 717/136–161, 106
See application file for complete search history.

(56) References Cited

U.S. PATENT DOCUMENTS

| | | | | |
|---|---|---|---|---|
| 5,359,730 | A * | 10/1994 | Marron | 717/169 |
| 5,920,725 | A * | 7/1999 | Ma et al. | 717/171 |
| 6,298,477 | B1 * | 10/2001 | Kessler | 717/145 |
| 6,973,644 | B2 * | 12/2005 | Nylander et al. | 717/139 |
| 7,017,151 | B1 * | 3/2006 | Lopez et al. | 717/127 |
| 7,062,755 | B2 * | 6/2006 | Partamian et al. | 717/124 |
| 2004/0143825 | A1 * | 7/2004 | Hicks | 717/148 |
| 2005/0071811 | A1 * | 3/2005 | Appavoo et al. | 717/122 |
| 2006/0048134 | A1 * | 3/2006 | Napier et al. | 717/169 |
| 2007/0011655 | A1 * | 1/2007 | Tumati | 717/122 |

OTHER PUBLICATIONS

Feng et al., Dynamic evolution of network management software by softwarehot-swapping, IEEE, 2001, on pp. 63-76.*
Hong Lye Oh, Memory Allocation Techniques in System with Dynamic Swapping of Application Codes, IEEE, Jun. 2002, pp. 1-13.*
Haga et al., Dynamic Functional Unit Assignment for Low Power, IEEE, 2003, pp. 485-497.*
Triantafyllis et al., Compiler Optimization-Space Exploration; IEEE, 2003, pp. 1-12.*
Poletto et al., C and tcc: A Language and Compiler for Dynamic Code Generation; ACM, 1999, vol. 21, pp. 324-369.*

* cited by examiner

*Primary Examiner*—Wei Y Zhen
*Assistant Examiner*—Satish Rampuria

(57) ABSTRACT

Embodiments of the invention relate to hot-swapping a live dynamic code generator. In an embodiment, hot-swapping is done in the Java execution environment. The dynamic code generator to be hot-swapped is stored in a module of a shared library separated from other components of the Java environment such as the garbage collector, the class loader, the Java Native Interface, the threading and synchronization package, etc. A graphical user interface (GUI) is provided so that the user can interact with the execution environment to control and perform hot-swapping.

29 Claims, 4 Drawing Sheets

HOT-SWAPPING A DYNAMIC CODE GENERATOR

FIELD OF THE INVENTION

Live or real-time replacement of software components of a running program is commonly known as hot-swapping of such components. Generally, the present invention relates to hot-swapping a dynamic code generator.

BACKGROUND OF THE INVENTION

Patching and upgrading software components in a production environment are often disruptive because they require the deployed application be shutdown and restarted after patching or upgrading is performed. Partial patching or upgrading a complex software package while it is running is even harder. The challenge is in maintaining business-as-usual status while patching or upgrading is taking place. Ideally, customers should be able to receive the expected functions from the software while live patching/upgrading is being performed.

In high performance execution environments related to interpreted programming languages, such as Java™ and Net, there is usually a dynamic optimizing compiler (also referred to as dynamic code generator) responsible for generating more efficient versions of the program code running inside the execution environment. These compiled versions of the program code generally run faster and are used in place of the interpreted versions as appropriate. However, when problems arise such as when there are failed compilations, or when a newer dynamic compiler with new functionality is available, the dynamic compiler is subject to being replaced, which is a challenging task to perform while the program is being executed, without shutting down any running applications, because the dynamic compiler is simultaneously interacting with other components of the execution environment. In a production environment where business disruptions are highly undesirable, real time patching or hot-swapping of the dynamic compiler is of higher importance.

SUMMARY OF THE INVENTION

Embodiments of the invention relate to hot-swapping a complete or parts of a live software component. In an embodiment, hot-swapping is done in the Java runtime environment. The compiler-to-be-hot-swapped is a dynamic compiler and is isolated in a module of a shared library separated from other components of the Java environment such as the garbage collector, the class loader, the Java Native Interface, the threading module, etc. A graphical user interface (GUI) and hot-swapping control software are provided so that the user can interact with the execution environment to control and perform a live hot-swap.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF VARIOUS EMBODIMENTS

In the following description, for the purposes of explanation, numerous specific details are set forth in order to provide a thorough understanding of the present invention. However, it will be apparent to one skilled in the art that the invention may be practiced without these specific details. In other instances, well-known structures and devices are shown in block diagram form in order to avoid obscuring the invention.

Overview

Figure 1:
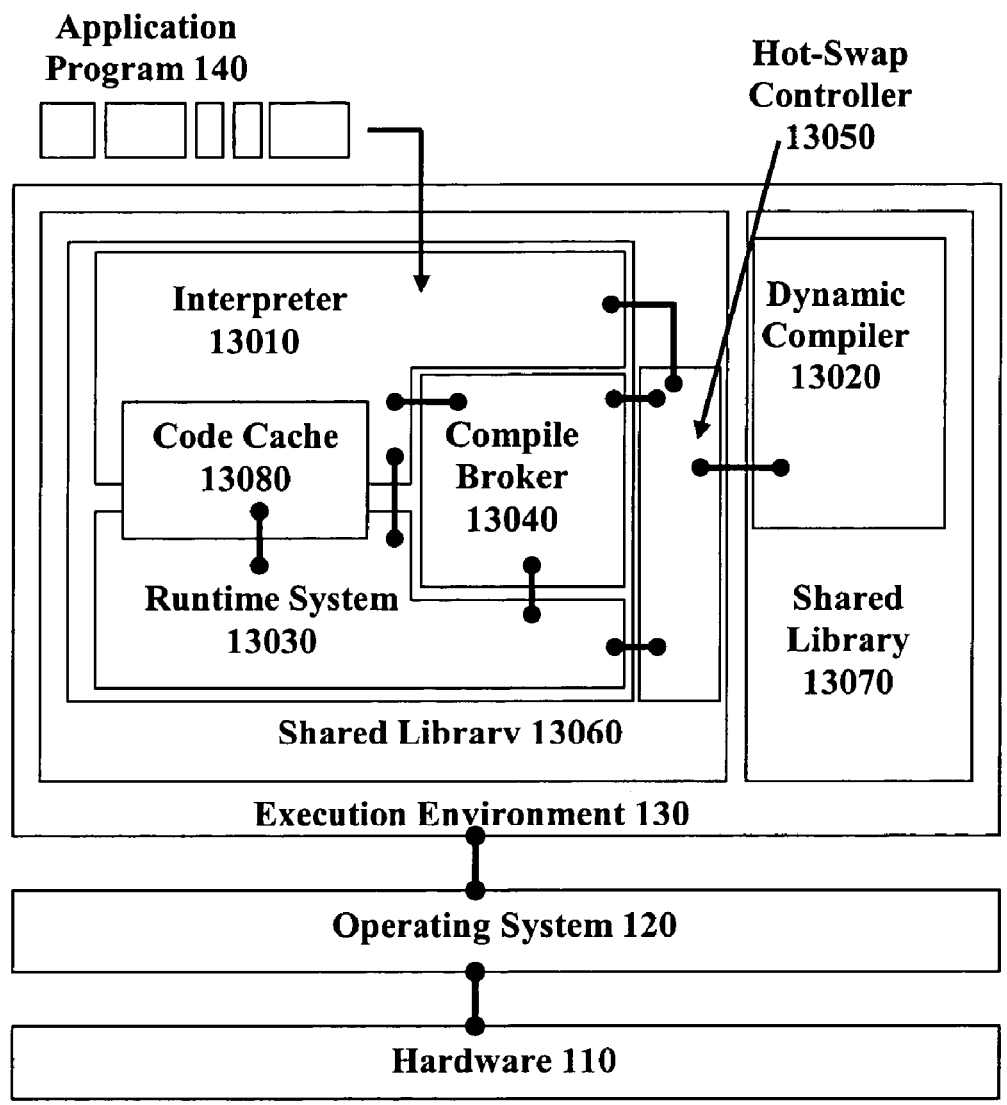
FIG. 1 shows an arrangement upon which embodiments of the invention may be implemented.

FIG. 1 shows arrangement 100 upon which embodiments of the invention may be implemented. Arrangement 100 includes hardware 110, an operating system 120, an execution environment 130, and a program application 140.

Program application 140 includes a plurality of code sequences, each of which is formed by an entry point and at least one exit point. Examples of a code sequence include a function in the C language, a method in the C++ or Java language, a procedure in the Pascal language, etc.

Hardware 110 and operating system 120 provide the platform based on which execution environment 130 executes program applications, such as application 140.

Execution environment 130 is a software implementation that allows computer programs written in interpreted languages such as the Java™ language and the Net language to be run on a particular hardware platform, such as hardware 110. In the Java™ paradigm, execution environment 130 may be referred to as the Java™ Virtual Machine (JVM). Execution environment 130 includes an interpreter 13010, a dynamic compiler 13020, a runtime system 13030, a compile broker 13040, a hot-swap controller 13050, a first shared library 13060, a second shared library 13070, and a code cache 13080.

Interpreter 13010 translates application 140 into low level-machine format. Together with runtime system 13030, interpreter 13010 can fully execute application 140 on operating system 130 and the underlying hardware 110. Generally, interpreter 13010 acts as a passive translator, i.e., it does not attempt to alter the program code of application 140. However, it relies on dynamic compiler 13020 to optimize the code sequences of application 140. Compilers generate more efficient code that runs many times faster than the original non-compiled version. Interpreter 13010, having a special logic, evaluates a code sequence to decide whether such code sequence should be compiled, and, if so, notifies compile broker 13040 so that compile broker 13040 can have this code sequence compiled. Alternatively speaking, interpreter 13010 determines whether a code sequence is "hot," so that the sequence can be compiled and executed in the compiled form instead of in the interpreted form since executing the compiled code runs faster than executing the interpreted code. In an embodiment, interpreter 13010 uses an invocation threshold to determine whether a code sequence is hot or not. For example, an invocation threshold of 5,000 indicates that a code sequence is not considered hot until it is invoked at least 5,000 times. Similarly, an invocation threshold of 10,000 indicates that the sequence is not considered hot until it is invoked at least 10,000 times. Interpreter 13010 controls the execution of the compiled version of a hot code sequence if such version exists in code cache 13080.

Dynamic compiler 13020 generates optimized code sequences corresponding to the code sequences of application 140 simultaneously as application 140 is being executed by interpreter 13010 in conjunction with execution environment 130. The generated code is stored in code cache 13080, and subsequent invocations of the same code sequence prompt interpreter 13010 to query code cache 13080 for the existence of a compiled/optimized version of the same code. If such a compiled/optimized version exists, then it is executed, else the incoming code sequence is interpreted by interpreter 13010. During execution, compiler 13020 may compile and recompile a code sequence several times to further optimize it. In the embodiment of FIG. 1, compiler 13020 is isolated into its own shared library 13070 so that it can be hot-swapped effectively. Compiler 13020 is commonly referred to as a dynamic compiler because it generates optimized code for program applications while these applications are running. Compiler 13020 may also be referred to as a dynamic code generator because it generates new, more optimal code sequences at the same time as these code sequences are being run/executed. As shown in the embodiment of FIG. 1, compiler 13020 is working in conjunction with interpreter 13010 in executing program applications. Contrasted to static compilers such as those for C or C++, the code of an application is completely compiled into binary code before it is executed, and compilation/code generation and optimization are not performed dynamically as the application is being executed Runtime system 13030 provides interfaces to operating system 120, and performs additional functions such as memory management, threading, synchronization, I/O support, etc.

Compile broker 13040 keeps track of code sequences qualified for compilation. Generally, compile broker 13040 places the code sequences in a compiler queue and passes them one at time to compiler 13020. Disengaging compiler 13020 from execution environment 130 includes preventing it from attempting to query the compiler queue for code to compile.

Hot-swap controller 13050 acts as a coupler/de-coupler between various functions in the two shared libraries 13060 and 13070. Hot-swap controller 13050 includes program instructions that enable hot-swap of compiler 13020. Exemplary functions of hot-swap controller 13050 include disengaging dynamic compiler 13020, clearing code cache 13080 based on user input, handling errors during the hot swap if they arise, etc. Hot-swap controller 13050 is embedded in shared library 13060. However, its user-controlled functions are exposed to the user through graphical user interface 200 described in detail in conjunction with FIG. 2.

Shared library 13060 contains hot-swap controller 13050 and other components found in a typical execution environment 130, such as the garbage collector, the class loader, the Java™ Native Interface, the threading and synchronization package, etc. Shared library 13070 is dedicated to contain dynamic compiler 13020. In other approaches compiler 13020 is generally included in shared library 13060 where it is tightly coupled with other components of execution environment 130. In such a condition, compiler 13020 may not be removed from execution environment 130 while it is executing because there would be interactions between compiler 13020 and other components of execution environment 130.

Code cache 13080 stores optimized code generated by compiler 13020.

Hotswapping the Compiler

Embodiments of the invention relate to hot-swapping a live software component such as dynamic compiler 13020 in arrangement 100. That is, while program applications, such as application 140, are being executed, removing compiler 13020 from execution environment 130, and providing to the same execution environment 130 a different version of compiler 13020. In an embodiment, execution environment 130 executes as usual alternating between interpreted and compiled modes. Once compiler 13020 is disengaged from execution environment 130, execution environment 130 operates completely in interpreted mode. In accordance with embodiments of the invention, such hot-swapping of compiler 13020 is transparent to outside users. That is, the users do not know whether compiler 13020 still exists or if it has been removed from execution environment 130; whether a new compiler 13020 has been installed in place of the old compiler 13020; whether execution environment 130 is operating completely in interpreted mode because compiler 13020 has been removed from the system; or whether execution environment 130 is executing in a mixed, interpreted and compiled, mode In embodiments where compiler 13020 is initially contained in a software library, e.g., shared library 13060, that is tightly coupled with other execution environment components, embodiments of the invention perform various steps to isolate compiler 13020 into a separated library, for example, shared library 13070.

The Graphical User Interface

Figure 2:
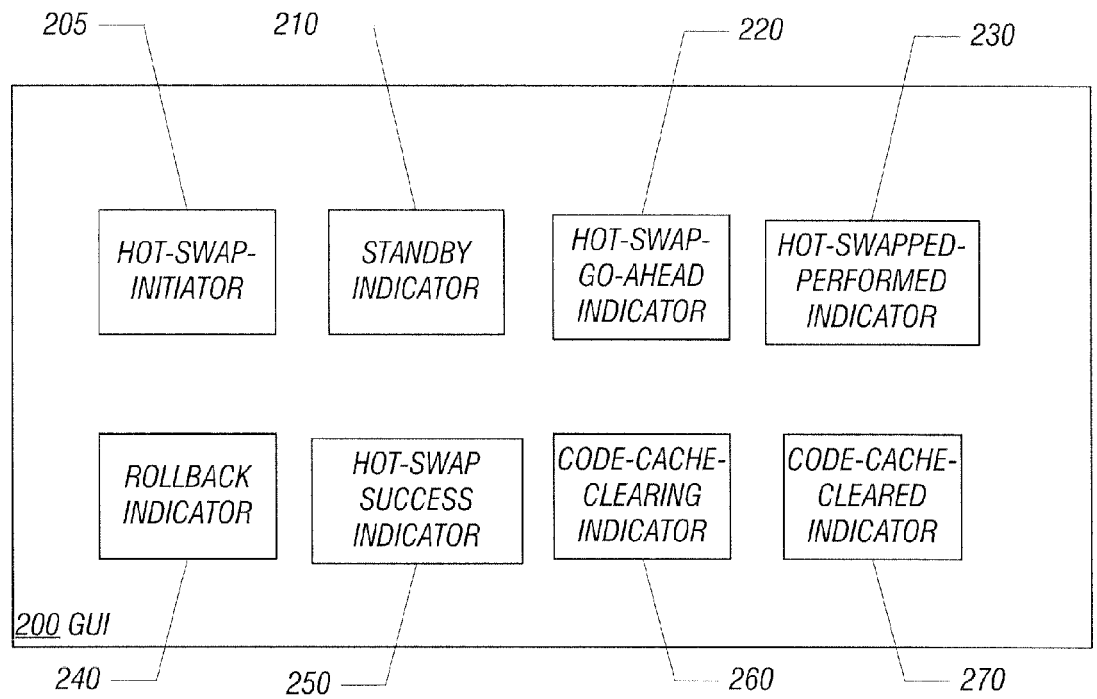
FIG. 2 shows a graphical user interface in accordance with an embodiment of the invention.

FIG. 2 shows a graphical user interface (GUI) 200, in accordance with an embodiment. GUI 200 allows a user to have access to functionality of hot-swap controller 13050 and thus enable them to control hot-swapping of compiler 13020. GUI 200 also serves as a means for communications between the user and execution environment 130 when performing the hot-swap. For example, via GUI 200, a user can initiate a hot-swap, clear the content of code cache 23080, inform execution environment 130 when a manual hot-swap is complete, etc. GUI 200 is hidden unless the user specifically activates it, and is dismissed (closed) upon finishing hot-swapping. In an embodiment, keying a "CTRL-I" activates GUI 200, and a subsequent CTRL-I dismisses it.

GUI 200 includes a hot-swap initiator 205, a standby indicator 210, a hot-swap-go-ahead indicator 220, a hot-swap-performed indicator 230, a rollback indicator 240, a hot-swap-success indicator 250, a code-cache-clearing initiator 260, and a code-cache cleared indicator 270.

Hot-swap initiator 205 is used by the user to inform execution environment 130 that the user desires to hot-swap dynamic compiler 13020.

Standby indicator 210 communicates to a user who initiated a hot-swap action, informing them to wait while execution environment 130 takes necessary actions in preparation for hot-swapping dynamic compiler 13020. For example, once GUI 200 is activated, it prompts the user to confirm the user's desire to hot-swap dynamic compiler 13020. Upon the user's confirmation by choosing "yes," execution environment 130 activates standby indicator 210 for the user to wait until work in preparation for performing the hot-swap has been completed.

Hot-swap-go-ahead indicator 220 indicates to the user that it is now safe to hot-swap dynamic compiler 13020, i.e., to remove the old compiler and introduce a new one. This indicator 220 is activated after operations leading to this stage have been successfully completed. For example, upon receiving the response from the user who decided to hot-swap dynamic compiler 13020, execution environment 130 finalizes current compilations, disengages dynamic compiler 13020 from execution environment 130, and switches to operate completely in interpreted mode, execution environment 130 then activates hot-swap-go-ahead indicator 220. Disengaging dynamic compiler 13020 from execution environment 130 includes preventing execution environment 130 from detecting new code sequences for compilation, and instructing dynamic compiler 13020 to not query the compiler queue for existence of code sequences awaiting compilation. In an embodiment, execution environment 130 increases the hot-swap threshold to a very high value so that no code sequence can be considered hot, and therefore no code sequence would be queued for compilation.

Hot-swap-performed indicator 230 is generally invoked by the user to inform execution environment 130 that the old compiler has been removed and the new compiler has been introduced.

Rollback indicator 240 is presented to the user to inform them of a failed hot-swap operation. In an embodiment, a failed hot-swap operation automatically results in rolling back to the original dynamic compiler 13020.

Hot-swap-success indicator 250 is presented to the user to inform them of a successful hot-swap operation.

Code-cache clearing initiator 260 is used by the user to inform execution environment 130 that the user desires to clear all native code generated by the old dynamic compiler 13020. In an embodiment, execution environment 130, upon receiving a message from this indicator 260, clears code cache 13080 by marking all native code sequences contained in code cache 13080 as invalid.

Code-cache-cleared indicator 270 informs the user of a successful clearing of code cache 13080.

Illustration of a Method Embodiment

Figure 3:
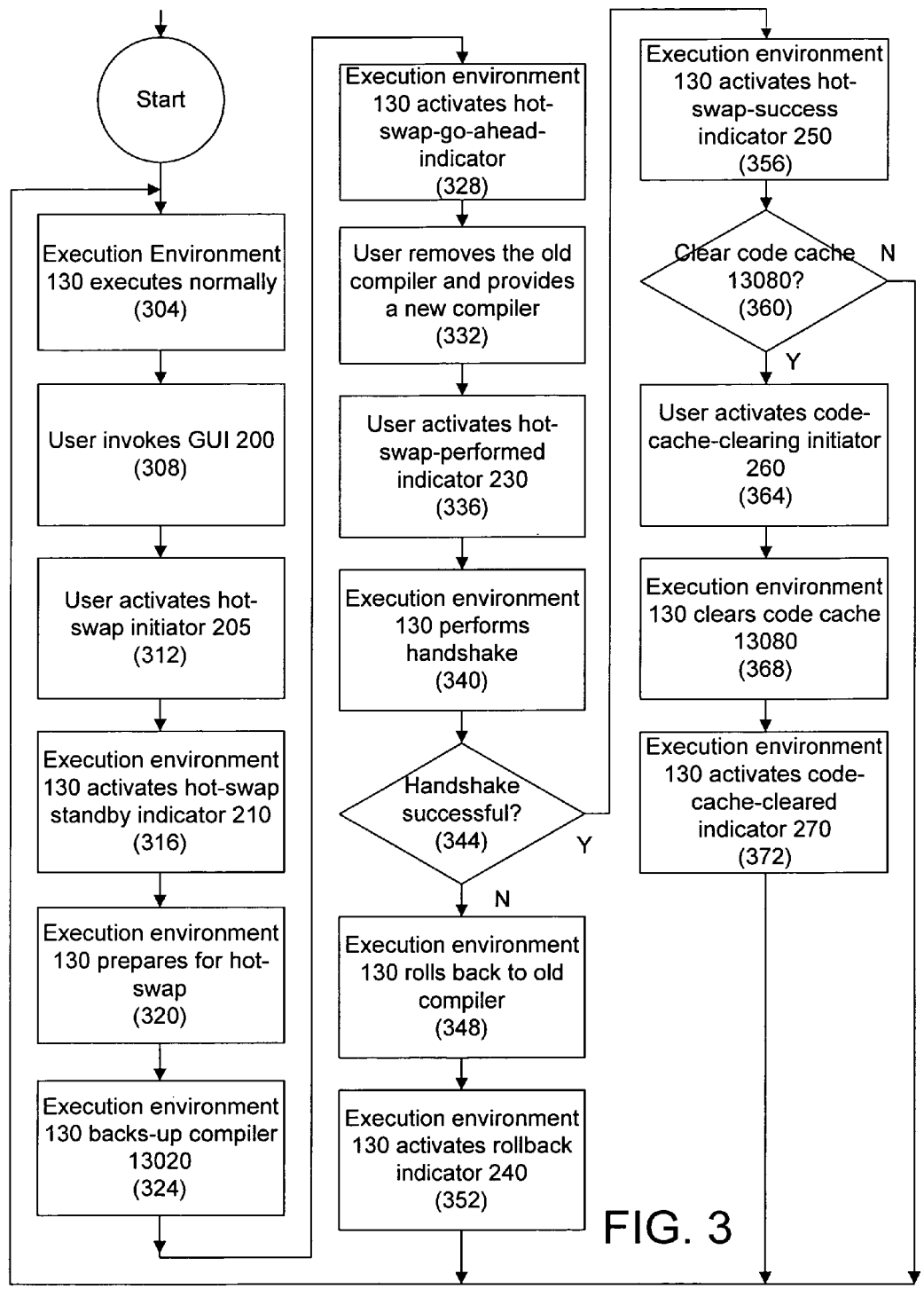
FIG. 3 shows a flowchart illustrating a first method embodiment of the invention.

FIG. 3 shows flowchart 300 illustrating a method embodiment of the invention.

In block 304, execution environment 130 operates normally, e.g., executing programs in a mixed, interpreted and compiled, mode.

In block 308, a user with a desire to hot-swap compiler 13020 invokes GUI 200, thereby displays it on a computer screen.

In bock 312, the user activates hot-swap initiator 205, which signals execution environment 130 that the user desires to hot swap compiler 13020.

In block 316, execution environment 130 activates standby indicator 210 to inform the user that execution environment 130 is preparing for the user to perform a hot-swap.

In block 320, execution environment 130 prepares for the hot-swap, performing tasks such as bringing the system to a safe state, disengaging compiler 13020 from execution environment 130, etc. In an embodiment, a safe state is reached when system 100 is not in the middle of a compilation, not in the middle of depositing compiled code in code cache 13080, etc. If system 100 is in the middle of such a task, then execution environment 130 may immediately terminate the task or allow it to complete, if that is the best course of action. Execution environment 130 may complete execution of a thread, execute a thread to a point so that it can later be resumed once the hot-swap is complete, immediately halts a thread, put it in a standby mode, etc. Normally, execution environment 130 would not start a new process, particularly one that might use compiler 13020.

To disengage compiler 13020 from execution environment 130, execution environment 130 clears the compiler queue, stops providing additional code to this queue, and/or inhibits compiler 13020 from accessing this queue for compiling code. In an embodiment, execution environment 130 sets the hot-method threshold to a very high value so that no running application code can be considered hot, and, as a result, no code is provided to the compiler queue for compilation. For example, if a hot-method threshold is normally at 5,000, then execution environment 130 may set this value to 1,000,000, which is extremely high considering the normal value of 5,000. Further, dynamic compiler 13020 queries the compiler queue for methods to compile only if hot-swap action has not been initiated. As a result, dynamic compiler 13020, prior to pulling the next method from the compiler queue, checks to see if hot-swapping has been initiated, e.g., hot-swap initiator 205 has been invoked, and, if so, prevents itself from taking that method for compilation. Consequently, initiating a hot-swap action automatically prevents dynamic compiler 13020 from accessing the compiler queue. Once compiler 13020 is disengaged from execution environment 130, execution environment 130 operates completely in interpreted mode.

When preparation for a hot-swap is complete, execution environment 130, in block 324, backs-up the original dynamic compiler 13020, e.g., reserves a copy of dynamic compiler 13020. In block 328, execution environment 130 activates hot-swap-go-ahead indicator 220 to inform the user that they may hot-swap dynamic complier 13020 as appropriate. In block 332, the user swaps the compiler, i.e., remove the old compiler 13020 and provide a new compiler 13020. For example, if the old compiler is stored in module "dycom.so," then the user replaces module dycom.so in execution environment 130 with a different module, which has the same name dycom.so. Embodiments of the invention are not limited to how a user may provide the new compiler.

Once the user introduces the new compiler, the user, in block 336, activates the hot-swap-performed indicator 230 to indicate that a new compiler has been put in place.

In the meantime, after activating the hot-swap-go-ahead indicator 220 in block 326, execution environment 130 keeps polling for the message from hot-swap-performed indicator 230.

After receiving the message from this hot-swap-performed indicator 230, execution environment 130, in block 340, performs a handshake to make sure that the newly installed compiler 13020 functions properly. In an embodiment, execution environment 130 executes a handshake method commonly known in the programming practice. For example, if this method returns a logical true, then the handshake is successful indicating that the newly installed compiler would function properly. However, if the method returns a logical false, then the handshake is unsuccessful, indicating that the newly installed compiler will not function properly.

If the handshake is not successful, then execution environment 130, in block 348, rolls back to the old compiler that was backed-up in block 324. That is, execution environment 130 removes the newly installed compiler and re-inserts the old compiler back into execution environment 130. In block 352, execution environment 130 activates rollback indicator 240, informing the user that the hot-swap in fact failed and execution environment 130 had rolled back to the old compiler. Execution environment 130 then executes normally in block 304.

If the handshake is successful, then execution environment 130, in block 356, activates hot-swap-success indicator 250, e.g., to inform the user that the hot-swap is successful. Because the hot-swap is successful, execution environment 130, in conjunction with the dynamic linker, adapts the new compiler 13020 to system 100. That is, execution environment 130 can function in both the interpreted and compiled mode as appropriate using the newly introduced compiler. Execution environment 130 restores compilation affecting controls to their original state in preparation for normal resumption of mixed, interpreted and compiled execution.

In block 360, execution environment 130 queries the user to determine whether the user desires to clear code cache 13080. Not clearing code cache 13080 enables the user to use optimized code produced by the old compiler 13020 that is still in code cache 13080. In contrast, clearing code cache 13080 enables the user to use the optimized code that will be generated by the newly installed dynamic compiler 13020.

If the user decides not to clear code cache 13080, then execution environment 130 resumes normal execution in block 304. However, if the user decides to clear code cache 13080, then the user, in block 364, activates code-cache-clearing initiator 260. Execution environment 130, upon receiving the message from this initiator 260, clears code cache 13080 in block 368. Once code cache 13080 is cleared, execution environment 130, in block 372, activates code-cache-cleared indicator 270, and execution environment 130 resumes normal execution in block 304.

Figure 4:
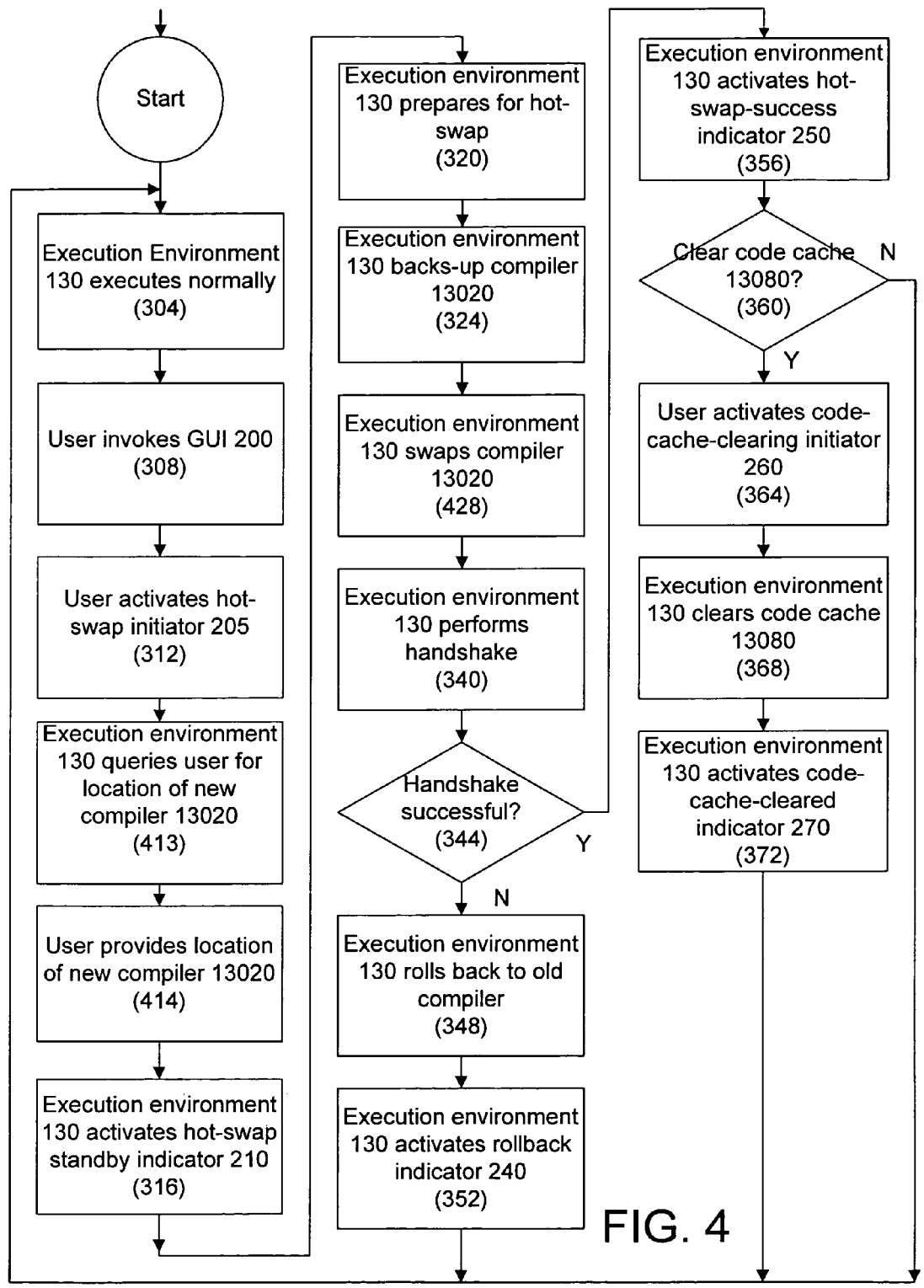
FIG. 4 shows another flowchart illustrating a second method embodiment of the invention.

In the above illustration, compiler 13020 is swapped manually, i.e., a user removes the old compiler and provides a new one. However, such process may be automated, i.e., performed by execution environment 130. FIG. 4 shows a flowchart 400 illustrating this automation, in accordance with an embodiment. Flowchart 400 includes modifications as compared to flowchart 300 in which the blocks starting with number "3," e.g., 304, 308, etc., are the same as in FIG. 3, and the blocks starting with number "4," e.g., 416, 420, etc., indicate the modifications. For example, upon receiving the signal from hot-swap initiator 205 in block 312, execution environment 130, in block 413, queries the user for the location of the new compiler. In block 414, the user provides such location. Alternatively, a software vendor provides new versions of dynamic compiler 13020 accessible by execution environment 130 through a communication network, e.g., the Internet. Execution environment 130 then presents a list of suitable replacements to the user, who selects a version, in block 424. After preparing for hot-swap and backing-up compiler 13020 in block 320 and 324, respectively, execution environment 130, having the new compiler/its location, performs the hot-swap itself in block 428, and flowchart 406 continues from block 340 as in FIG. 3.

FIG. 4 is provided for illustration purposes only, in accordance with embodiments in which compiler 13020 is swapped automatically, various desires of the user may be provided right after GUI 200 is invoked. For example, the user may provide the location of the new compiler when the user activates hot-swap initiator 205 in block 312. Additionally, at this block 312, the user may indicate the user's desire to clear code cache 13080. That is, the user activates code-cache-clearing initiator 260 at this block 312, instead of waiting until block 364, etc.

Embodiments of the invention are advantageous over other approaches because compiler 13020 is swapped on the fly without program applications, such as application 140, being brought down; the hot-swap action is transparent to users of the execution environment and all applications running inside it, etc.

Computer

A computer may be used to run system 100, to execute instructions of components of system 100, to perform embodiments in accordance with the techniques described in this document, etc. For example, a CPU (Central Processing Unit) of the computer executes program instructions implementing the embodiments by loading the program from a CD-ROM (Compact Disc—Read-Only Memory) to RAM (Random Access Memory and executes those instructions from RAM. The program may be software, firmware, or a combination of software and firmware. In alternative embodiments, hard-wire circuitry may be used in place of or in combination with program instructions to implement the described techniques. Consequently, embodiments of the invention are not limited to any one or a combination of software, firmware, hardware, or circuitry.

Instructions executed by the computer may be stored in one or more computer readable-media from which a computer reads information. Computer-readable media may be magnetic medium such as, a floppy disk, a hard disk, a zip-drive cartridge, etc.; optical medium such as a CD-ROM, a CD-RAM, etc.; memory chips, such as RAM, ROM, EPROM (Erasable Programmable Read-Only Memory), EEPROM (Electrically Erasable Programmable Read-Only Memory), etc.

In the foregoing specification, the invention has been described with reference to specific embodiments thereof. However, it will be evident that various modifications and changes may be made thereto without departing from the broader spirit and scope of the invention. Accordingly, the specification and drawings are to be regarded as illustrative rather than as restrictive.

What is claimed is:

1. A method for hot-swapping a first code generator, comprising:
while a program using the first code generator is being executed by an execution environment in a computer,
receiving an indication to hot-swap the first code generator, wherein the first code generator is configured to generate a new code sequence based on a code sequence of the program;
in response to receiving the indication, preparing to hot-swap the first code generator by the execution environment, wherein the preparing includes disengaging the first code generator from the execution environment, wherein the preparing includes disengaging the first code generator from the execution environment and allowing execution of the program to be in an interpreted mode only;
once preparing is complete, removing the first code generator from the execution environment and introducing a second code generator in the execution environment to replace the first code generator; and
interpreting code sequences of the program using an interpreter when the execution environment is in the interpreted mode only.

2. The method of claim 1 wherein the execution environment includes the interpreter that interprets a first code sequence of the program and, if the first code sequence is qualified for the first code generator, then the first code generator generates, from the first code sequence, a second code sequence to be executed in place of the first code sequence.

3. The method of claim 1 wherein the first code generator and the second code generator are each a dynamic compiler working in conjunction with an interpreter to execute the program.

4. The method of claim 1 wherein:
the indication is received from a user interface; and
the removing and introducing are performed by the execution environment.

5. The method of claim 1 further comprising rolling back to the first code generator if there is indication that the second code generator would not function properly.

6. The method of claim 1 further comprising:
receiving an indication to clear a code cache storing code generated by the first code generator; and
clearing the code cache in response to receiving the indication to clear the code cache.

7. The method of claim 1 wherein the disengaging includes one or a combination of: stopping providing code to a queue for processing by the first code generator; and inhibiting the first code generator from accessing the queue.

8. The method of claim 1 wherein before preparing to hot-swap, the program is executed in both interpreted mode and compiled mode.

9. The method of claim 1 wherein the preparing further includes bringing the program to a safe state.

10. The method of claim 1, further comprising:
wherein disengaging the first code generator from the execution environment prevents the execution environment from detecting new code sequences for processing by the first code generator, and causes the first code generator to be instructed to not check a queue containing code sequences for processing by the first code generator.

11. A system comprising:
a central processing unit (CPU);
an operating system, a graphical user interface; an interpreter; a first dynamic compiler; and a hot-swap controller; all of which include program instructions executable on the CPU to perform their respective functions;
wherein while a program is being executed in both interpreted mode and compiled mode, the graphical user interface is to provide a user-invoked indication to cause a hot-swap of the first dynamic compiler using functionalities of the hot-swap controller, wherein the hot-swap of the first dynamic compiler includes removing the first dynamic compiler from an execution environment in the system and providing a new dynamic compiler in the execution environment and wherein the hot-swap controller is responsive to the user-invoked indication to disengage the first dynamic compiler from the execution environment and to cause the execution environment to operate in an interpreted mode only,
wherein the interpreter is to interpret code sequences of the program when the execution environment is in the interpreted mode only.

12. The system of claim 11 wherein the graphical user interface includes a hot-swap initiator and at least one of: a hot-swap standby indicator, a hot-swap-go-ahead indicator, a hot-swap-performed indicator, a rollback indicator, a hot-swap-success indicator, a code-cache-clearing initiator, and a code-cache-cleared indicator.

13. The system of claim 11 wherein:
the hot-swap controller, in response to the user-invoked indication from the graphical user interface, is configured to cause preparation for the hot-swap that includes the disengaging of the first dynamic computer.

14. The system of claim 13 wherein disengaging the first dynamic compiler from the execution environment comprises one or a combination of:
stopping presenting code to-be-compiled by the first dynamic compiler to a compiler queue; and
inhibiting the first dynamic compiler from accessing the compiler queue.

15. The system of claim 13 wherein preparation for the hot-swap further includes allowing the program to reach a safe state.

16. The system of claim 13 wherein, upon completion of preparation for the hot-swap, the hot-swap is performed by either the hot-swap controller or the user.

17. The system of claim 13, wherein disengaging the first dynamic compiler from the execution environment prevents the execution environment from detecting new code sequences for compiling by the first dynamic compiler, and causes the first dynamic compiler to be instructed to not check a queue containing code sequences for compiling by the first dynamic compiler.

18. The system of claim 11 wherein, via the graphical user interface, a location of the new dynamic compiler is provided to the hot-swap controller to cause hot-swap of the first dynamic compiler with the new dynamic compiler.

19. The system of claim 18 wherein the system is configured to use the Internet to reach the location of the new dynamic compiler.

20. The system of claim 11, wherein the first dynamic compiler is to compile the program to generate compiled code that is executed in the execution environment.

21. The system of claim 20, wherein the interpreter is to execute the program in interpreted mode, and the interpreter is to cause the first dynamic compiler to compile the program to generate the compiled code in response to determining that the program has been invoked greater than a predetermined number of times.

22. A non-transitory computer-readable storage medium storing program instructions that when executed by a computer performs:
while a program is being executed by an execution environment in both interpreted mode and compiled mode
receiving an indication to initiate a hot-swap of a first dynamic compiler;
in response to recognizing such indication, preparing for the hot-swap, wherein the preparing includes disengaging the first dynamic compiler from the execution environment and allowing execution of the program to be in an interpreted mode only;
once the preparation is complete, removing the first dynamic compiler from the execution environment and installing a new dynamic compiler; and
interpreting code sequences of the program using an interpreter when the execution environment is in the interpreted mode only.

23. The medium of claim 22 wherein the new dynamic compiler is obtained via the Internet.

24. The medium of claim 22, wherein the first dynamic compiler compiles the program to generate compiled code that is executed in the execution environment.

25. The medium of claim 24, wherein the program instructions when executed cause the computer to further:
run the program using the interpreter in the interpreted mode in the execution environment, wherein the interpreter interprets code of the program; and
in response to the interpreter determining that the program has been invoked more than a predetermined number of times, cause the first dynamic compiler to compile the program to generate the compiled code.

26. The medium of claim 22,
wherein disengaging the first dynamic compiler from the execution environment prevents the execution environment from detecting new code sequences for compiling by first dynamic compiler, and causes the first dynamic compiler to be instructed to not check a queue containing code sequences for compiling by the first dynamic compiler.

27. A method for hot-swapping a first code generator, comprising:
while a program using the first code generator is being executed by an execution environment in a computer,
receiving an indication to hot-swap the first code generator, wherein the first code generator is configured to generate a new code sequence based on a code sequence of the program;
in response to receiving the indication, preparing to hot-swap the first code generator by the execution environment, wherein the preparing includes disengaging the first code generator from the execution environment and allowing execution of the program to be in an interpreted mode only, wherein disengaging the first code generator from the execution environment prevents the execution environment from detecting new code sequences for processing by the first code generator, and causes the first code generator to be instructed to not check a queue containing code sequences for processing by the first code generator;
once preparing is complete, removing the first code generator from the execution environment and introducing a second code generator in the execution environment to replace the first code generator;
interpreting code sequences of the program using an interpreter when the execution environment is in the interpreted mode only; and
after disengaging the first code generator from the execution environment, activating an indication in a graphical user interface to indicate to a user that it is safe to hot-swap the first code generator with the second code generator.

28. A system comprising:
a central processing unit (CPU);
an operating system, a graphical user interface; an interpreter; a first dynamic compiler;
and a hot-swap controller; all of which include program instructions executable on the CPU to perform their respective functions;
wherein while a program is being executed in both interpreted mode and compiled mode, the graphical user interface is to provide a user-invoked indication to cause a hot-swap of the first dynamic compiler using functionalities of the hot-swap controller, wherein the hot-swap of the first dynamic compiler includes removing the first dynamic compiler from an execution environment in the system and providing a new dynamic compiler in the execution environment,
the hot-swap controller, in response to the user-invoked indication from the graphical user interface, is configured to cause preparation for the hot-swap,
wherein to prepare for the hot-swap, the first dynamic compiler is disengaged from the execution environment, wherein disengaging the first dynamic compiler from the execution environment prevents the execution environment from detecting new code sequences for compiling by the first dynamic compiler, and causes the first dynamic compiler to be instructed to not check a queue containing code sequences for compiling by the first dynamic compiler,
wherein, after disengaging the first dynamic compiler from the execution environment, the graphical user interface is configured to activate an indicator to indicate to a user that it is safe to hot-swap the first dynamic compiler with the new dynamic compiler.

29. A computer-readable medium storing program instructions that when executed by a computer performs:
while a program is being executed by an execution environment in both interpreted mode and compiled mode
receiving an indication to initiate a hot-swap of a first dynamic compiler;
in response to recognizing such indication, preparing for the hot-swap;
once the preparation is complete, removing the first dynamic compiler from the execution environment and installing a new dynamic compiler,
wherein the preparing includes disengaging the first dynamic compiler from the execution environment and allowing execution of the program to be in an interpreted mode only,
wherein in the interpreted mode, code sequences of the program are interpreted by an interpreter,
wherein disengaging the first dynamic compiler from the execution environment prevents the execution environment from detecting new code sequences for compiling by the first dynamic compiler, and causes the first dynamic compiler to be instructed to not check a queue containing code sequences for compiling by the first dynamic compiler
wherein the program instructions when executed by the computer further perform:
after disengaging the first dynamic compiler from the execution environment, activating an indicator in a graphical user interface to indicate to a user that it is safe to hot-swap the first dynamic compiler with the new dynamic compiler.

* * * * *

UNITED STATES PATENT AND TRADEMARK OFFICE
CERTIFICATE OF CORRECTION

PATENT NO. : 7,853,934 B2  
APPLICATION NO. : 11/165004  
DATED : December 14, 2010  
INVENTOR(S) : Noubar Partamian Page 1 of 1

It is certified that error appears in the above-identified patent and that said Letters Patent is hereby corrected as shown below:

In column 8, lines 50-52, in Claim 1, delete "environment, wherein the preparing includes disengaging the first code generator from the execution environment" and insert -- environment --, therefor.

In column 9, line 49, in Claim 11, delete "environment" and insert -- environment, --, therefor.

In column 11, line 7, in Claim 26, delete "by first" and insert -- by the first --, therefor.

Signed and Sealed this
Seventh Day of June, 2011

David J. Kappos
*Director of the United States Patent and Trademark Office*